June 26, 1956  L. THOMPSON  2,752,216
COLD STORAGE DEVICE FOR VEHICLES
Filed June 5, 1952
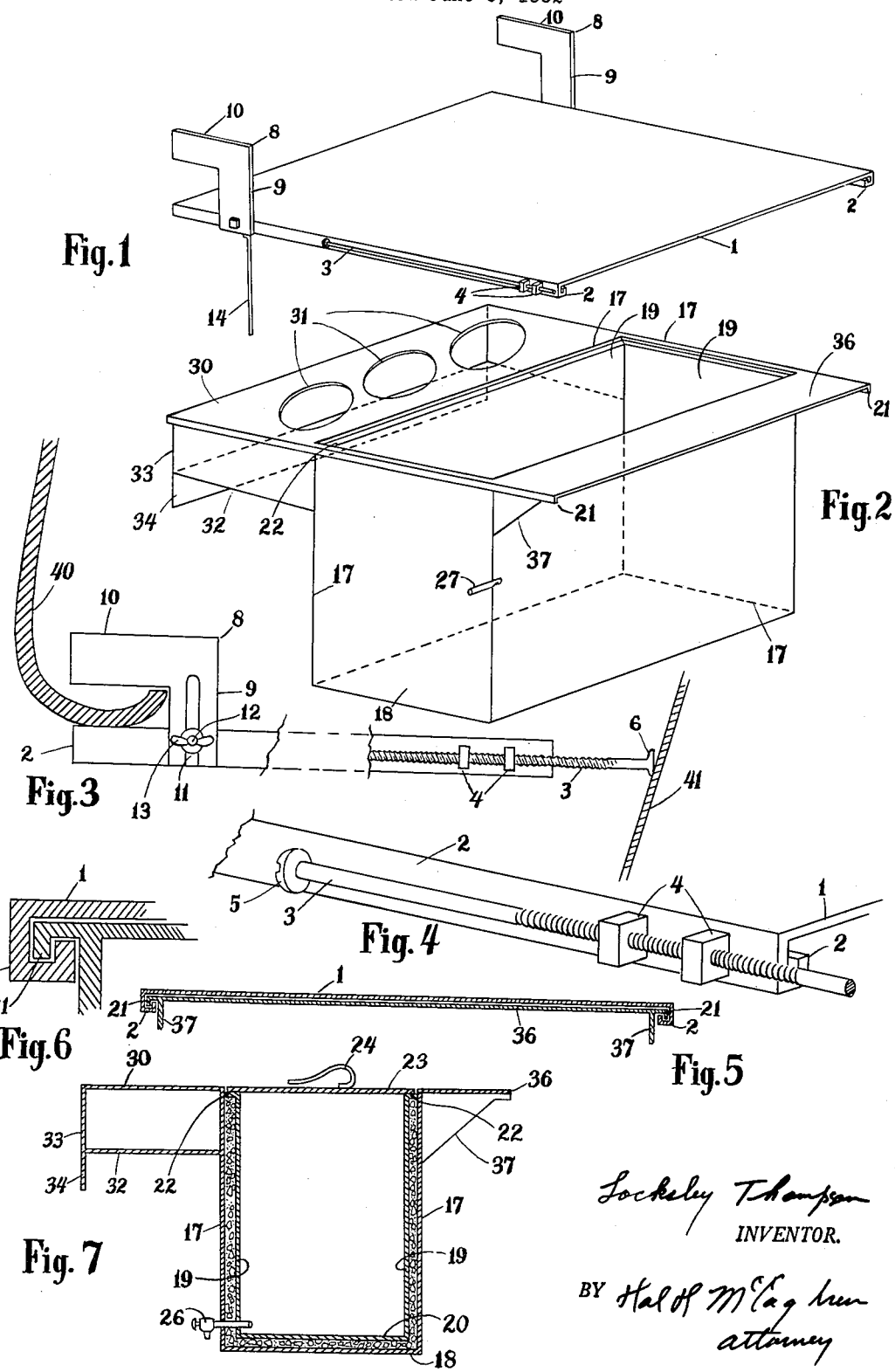

United States Patent Office 2,752,216
Patented June 26, 1956

2,752,216
COLD STORAGE DEVICE FOR VEHICLES
Locksley Thompson, West Palm Beach, Fla.
Application June 5, 1952, Serial No. 292,003
1 Claim. (Cl. 312—214)

This invention relates to cold storage devices, and more particularly is directed to cold storage devices attachable to vehicles in general and to and beneath an instrument panel of an automobile specifically.

An object of the invention is to provide an insulated ice chamber slidably mounted to a cover which is secured to and beneath an instrument panel or dash board of an automobile.

Another object of this invention is to provide a device of the class described, which is so constructed and arranged to be rapidly and removably mounted in any automobile.

A further object of this invention is to provide a device of the class described with cooperating guideways mounting the ice chamber and cover in slidable relationship.

A further object of this invention is to provide a device of the class described which can be mounted in any automobile, boat or similar structure and be noiseless when the vehicle is in motion.

A still further object of this invention is to provide a device of the class described which will be simple and economical in construction, and durable and efficient in use.

The foregoing and other objects and advantages of this invention will be more apparent from reading the following specification in conjunction with the drawings, forming a part thereof, wherein:

Fig. 1 is a perspective view of the cover or lid of the device;

Fig. 2 is a perspective view of the ice chamber with a bottle-holding tray attached and a ledge extension for reinforced guideway extension;

Fig. 3 is a broken side elevation view of the cover or lid showing it attached to and beneath the dash of an automobile, with the dash and fire wall shown in section;

Fig. 4 is a perspective view of nut and bolt assembly as attached to cover guideway for compressibly mounting the lid;

Fig. 5 is cross-sectional view of the lid and upper part of the ice chamber showing the cooperating guideways in operable relationship, parts removed for clarity;

Fig. 6 is an enlarged cross-sectional view of one lid or cover guideway and one ice chamber guideway in operable relationship; and Fig. 7 is a cross-sectional view of the ice chamber with bottle tray and extension guideway shelf attached, and water spigot and handle of ice container cover shown in elevation.

Referring to the drawing, wherein like members are given the same reference numeral, a lid or cover 1, preferably rectangular and of any suitable material, such as plastic, aluminum, plywood, synthetic resin impregnated fibre-glass and the like, but preferably of stainless-steel, is provided with a pair of parallel opposed guideways 2 of substantially U-shaped cross-section or channel shaped. These guideways 2 may be formed in any suitable manner depending upon material employed and may be formed separately and secured thereto or formed integral therewith. When the preferred material, stainless steel, is employed, the guideways 2 are preferably formed by mandrel bending or stamping opposed edges or sides of the cover or lid 1 to provide these parallel channels or guideways of U-shaped cross-section. A bolt 3 having two nuts 4 threadedly positioned thereon in spaced relationship is secured to the outside of each of the guideways 2 in longitudinally parallel relationship thereto, preferably by welding or brazing the nuts 4 thereto. It is preferred to use a round split head bolt 5 whereby the bolt may be turned with an ordinary screw driver; other types of bolts can be used, however, providing due care is taken in mounting to provide for free rotation of the bolt. A foot 6 is provided on the bolt 4 in any suitable manner, such as brading after the nuts are positioned thereon, or by welding a separate member thereon. Positioned on each guideway 2 is an inverted L-shaped member 8 with one leg 9 thereof being substantially perpendicular to the longitudinal axis of the guideway 2, and the other leg 10 being substantially parallel and spaced from the guideway 2 and extending in the opposite direction from the foot 6 of the bolt 4. These members 8 may be secured to the guideways 2 by any suitable means well known in the art, such as spot welding. It is preferred, however, to have these members 8 vertically adjustable to adjust the space between the leg 10 and cover 1; accordingly, the leg 9 has a central section removed to provide an elongated slot 11 extending longitudinally therein and adapted to receive a stud bolt 12 secured to the guideway 2. A nut 13, preferably a wing nut, threadedly engaging the nut 13 clamps the leg 9 between the guideway 2 and nut 13 to secure the member 8 in any preferred elevation. Extending downwardly from one of the inverted L-shaped members 8 is a flat spring steel member 15 which cooperates with a stop member on the ice chamber as will be more fully described hereinafter.

A spaced double wall ice chamber having outer walls 17 and bottom wall 18 and inner walls 19 and bottom 20 with the space therebetween filled with thermal insulating material, such as ground cork, fibre glass and the like, is provided with opposed parallel guideways 21 so constructed and arranged to be received by the cover guideways 2 in slidable relationship and support the ice chamber from the cover 1. These guideways 21 are preferably formed as a downward projection. The inner walls 19 of the ice chamber are preferably depressed with respect to the outer walls 17 and the void between the two sets of walls is covered at the top by a member 22, which may be a template cut to size or formed by bending the top sections of the inner walls 19 to abut the outer walls 17 with corner inserts made; of course, an air seal is provided by soldering or welding this member 22 to the walls 17, and if a template to the walls 19. A lid 23 is provided to fit over the inner walls 19 and between the outer walls 17, having substantially centrally positioned a resilient handle 24, preferably an arcuate leaf spring fastened at one end to the lid 23 in any suitable manner such as spot welding. This handle 24 abuts the lower surface of the cover 1 when the ice chamber guideways 21 are inserted in the cover guideways 2 and partially slidably engaged, thus preventing rattling as the spring handle 24 exerts sufficient force on the ice chamber to force the cooperating guideway elements into pressure abutment. A water spigot 26 is frequently installed in the ice chamber walls in the ordinary manner with the opening thereof communicating with the ice compartment slightly above the inner bottom 20 and inside the inner wall 19. As illustrated, this spigot is mounted in the front and is a spring plunger actuated type, but of course any type water cock could be used, on any convenient wall position. There is also provided on the back wall of the ice chamber an outwardly extending projection 27 so positioned to abut the leaf spring 14 on the cover 1 when the ice chamber is pulled forward with respect to the cover; by pulling the end of the leaf spring 14 outwardly, the projection 27 does not then abut the spring 14 and the ice chamber can be removed from the cover 1.

Because it is frequently desirable to have a tray or bottle holder provided, particularly when traveling with small children, there is provided a bottle holder having a top 30, preferably formed integral with the ice chamber and provided with a plurality of apertures 31 to receive bottles, glasses and the like. The holder also is provided with a bottom 32 and front 33, which preferably extends below the bottom 32 to provide a pull member 34. Side member may or may not be provided as desired. It is preferred to stamp this member integral with the ice chamber, but it may be formed separately and secured thereto in any suitable manner, such as welding. The guideways 21 are extended along this bottle holder element.

In order to support the ice chamber and at the same time afford access thereto, the guideways 21 are extended rearwardly of the chamber itself. To reinforce and strengthen the extension of the guideways 21 a shelf 36 is provided therebetween and preferably formed integral therewith and with the other outer elements of the ice chamber in a single stamping. The shelf 36 and guideway 21 extensions are further reinforced by bracing members 37 in the form of triangular members secured to the outer wall 17 and shelf 36 in any suitable manner, such as welding.

In construction, the elements are preferably stamped of stainless steel and necessary seams welded, and additional elements spot welded as set forth hereinabove.

Installation and operation of the device are quite simple. The cover 1 is positioned with the dash board or instrument panel 40 positioned between and in tight abutment with the cover 1 and leg 10 of the inverted L-shaped member 8, after which the nut 13 is tightened. The bolt 3 is turned until the end or foot 6 thereof is firmly pressed against the fire wall 41. The shelf 36 extension of the guideways 21 are then inserted in the guideways 2 and pushed into slidable relationship. The leaf spring 14 is pulled outwardly to permit the projection 27 to clear, and the ice chamber is then pushed fully in until covered by the cover 1 and supported thereby beneath and behind the dash 40. To obtain access to the ice chamber, one pulls out on the handle 34 until the projection 27 abuts the leaf spring 14, at which point the lid 23 may be removed. To remove the ice chamber completely, the leaf spring 14 is held out of abutment with the projection 27 and the chamber pulled out.

The tray or bottle holder is preferably much more shallow than the ice chamber part of the device to provide ample leg room therebeneath.

When the device is mounted in a boat which does not have downward projections of a seat, or other vehicle without means for attaching the cover as illustrated, the cover may be attached in any other suitable manner, such as screw or bolts through the cover, and the ice chamber will still be slidably supported thereby due to the construction and arrangement of the cooperating guideways.

The invention has been described and illustrated in the more specific details of its preferred embodiment; it is to be understood that it is not, however, so limited. Many changes and modifications can be made without departing from the spirit of the invention or scope thereof as defined by the appended claim.

Having thus described the invention what is claimed as new and desired to secure by grant of Letters Patent is:

A cold storage device for mounting beneath the instrument panel of an automobile comprising a double walled ice chamber, heat insulating material between said double walls, a lid covering said ice chamber, a pair of parallel guideways provided near the top and on opposed sides of said ice chamber, said guideways extending beyond the periphery of said ice chamber, a cover covering said ice chamber and lid thereof, parallel guideways on said cover operably engaging said ice chamber guideways to support said ice chamber therefrom, projections secured to said cover guideways adapted to abut and project over the end of an instrument panel, extensible members on said cover guideways adapted to abut the fire wall of an automobile and urge said projections against the instrument panel, and a resilient member intermediate said cover and lid and abutting each of them and secured to one of them.

References Cited in the file of this patent

UNITED STATES PATENTS

| Number | Name | Date |
|---|---|---|
| 231,717 | Hartmeyer | Aug. 31, 1880 |
| 790,020 | Allen | May 16, 1905 |
| 1,382,837 | Jurek | June 28, 1921 |
| 1,526,685 | Toomey | Feb. 17, 1925 |
| 1,997,793 | Hull | Apr. 16, 1935 |
| 2,229,785 | Wray | Jan. 28, 1941 |
| 2,245,882 | Visser | June 17, 1941 |
| 2,309,888 | Edelmann | Feb. 2, 1943 |
| 2,530,876 | Harris | Nov. 21, 1950 |
| 2,541,453 | West | Feb. 13, 1951 |